United States Patent
Roper et al.

(10) Patent No.: US 11,078,947 B2
(45) Date of Patent: Aug. 3, 2021

(54) COMBUSTION QUENCHING FASTENER CAPS WITH HOLES

(71) Applicant: The Boeing Company, Chicago, IL (US)

(72) Inventors: Christopher Stephen Roper, Oak Park, CA (US); Randall Colin Schubert, Santa Monica, CA (US); Eddie Kwon, Seattle, WA (US); Jason S. Damazo, Seattle, WA (US); Darrin M. Hansen, Seattle, WA (US); Mark Randall O'Masta, Oak Park, CA (US); Morgan A. Stilke, Port Hueneme, CA (US)

(73) Assignee: THE BOEING COMPANY, Chicago, IL (US)

( * ) Notice: Subject to any disclaimer, the term of this patent is extended or adjusted under 35 U.S.C. 154(b) by 211 days.

(21) Appl. No.: 16/209,312

(22) Filed: Dec. 4, 2018

(65) Prior Publication Data
US 2020/0080585 A1    Mar. 12, 2020

Related U.S. Application Data

(60) Provisional application No. 62/729,677, filed on Sep. 11, 2018.

(51) Int. Cl.
*F16B 37/14* (2006.01)
*B64D 45/02* (2006.01)
(Continued)

(52) U.S. Cl.
CPC ........ *F16B 33/004* (2013.01); *B29C 45/0001* (2013.01); *B64D 45/02* (2013.01);
(Continued)

(58) Field of Classification Search
CPC ....... F16B 37/14; F16B 33/004; B64D 45/001
(Continued)

(56) References Cited

U.S. PATENT DOCUMENTS 2,173,046 A     9/1939  Smith
3,351,214 A *  11/1967  Herbert .................... F16D 9/06
                                                            213/9
(Continued)

FOREIGN PATENT DOCUMENTS

CA        2856687 A1     3/2015
CA        2858461 A1     3/2015
(Continued)

OTHER PUBLICATIONS

EP Search Report dated Jan. 30, 2020 in re EP Application No. 19195731.5.
(Continued)

*Primary Examiner* — Flemming Saether
(74) *Attorney, Agent, or Firm* — Coats & Bennett, PLLC

(57) ABSTRACT

A cover that extends over a fastener and methods of installing the cover over the fastener. The cover includes an open end positioned at a member from which the fastener extends. The cover also includes a closed end that extends over the fastener and shields the fastener from the exterior environment that can be combustible. A plurality of holes extend through the cover from the interior space to an exterior environment external to the cap.

20 Claims, 11 Drawing Sheets

(51) Int. Cl.
   F16B 33/00 (2006.01)
   B29C 45/00 (2006.01)
   F16B 21/07 (2006.01)
   B29K 27/18 (2006.01)
   B29K 71/00 (2006.01)
   B29L 31/30 (2006.01)

(52) U.S. Cl.
   CPC ............ F16B 21/073 (2013.01); F16B 37/14 (2013.01); *B29K 2027/18* (2013.01); *B29K 2071/00* (2013.01); *B29L 2031/3076* (2013.01); *F16B 2200/10* (2018.08)

(58) Field of Classification Search
   USPC .............................................. 411/372.5–377
   See application file for complete search history.

(56) References Cited

U.S. PATENT DOCUMENTS

| | | |
|---|---|---|
| 3,470,787 A | 10/1969 | Mackie |
| 4,519,974 A | 5/1985 | Bravenec et al. |
| 4,636,446 A | 1/1987 | Lee |
| 4,820,097 A * | 4/1989 | Maeda .................... F23R 3/002 165/168 |
| 4,826,380 A | 5/1989 | Henry |
| 5,108,853 A | 3/1992 | Feres |
| 5,749,690 A | 5/1998 | Kutz |
| 5,890,859 A * | 4/1999 | Hasnik ................ B60R 21/2037 411/372 |
| 6,425,720 B1 | 7/2002 | Kramer |
| 7,172,381 B2 * | 2/2007 | Miyazaki ................ F16B 37/14 411/372.6 |
| 8,717,736 B2 | 5/2014 | Asahara et al. |
| 9,188,226 B2 | 11/2015 | Pajel et al. |
| 9,228,604 B2 | 1/2016 | Dobbin |
| 9,744,923 B2 | 8/2017 | Parenti |
| 9,951,804 B2 | 4/2018 | Dobbin et al. |
| 10,040,568 B2 * | 8/2018 | Rebbeck ................ F16B 37/14 |
| 10,415,623 B2 | 9/2019 | Dobbin |
| 10,501,202 B2 * | 12/2019 | Roper ....................... F16B 5/02 |
| 2010/0322782 A1 | 12/2010 | Welch et al. |
| 2011/0123293 A1 | 5/2011 | Matlock et al. |
| 2012/0217673 A1 | 8/2012 | Hutter, III |
| 2013/0223951 A1 | 8/2013 | Bessho et al. |
| 2014/0048198 A1 | 2/2014 | Dobbin et al. |
| 2014/0341675 A1 | 11/2014 | Dobbin |
| 2015/0082603 A1 | 3/2015 | Rawdon et al. |
| 2015/0086295 A1 | 3/2015 | Cameron et al. |
| 2015/0271960 A1 | 9/2015 | Yoon et al. |
| 2016/0230801 A1 | 8/2016 | Dobbin et al. |
| 2020/0080585 A1 | 3/2020 | Roper et al. |
| 2020/0149580 A1 * | 5/2020 | Abou Halima ......... F16B 39/08 |

FOREIGN PATENT DOCUMENTS

| | | |
|---|---|---|
| CN | 105179432 A | 12/2015 |
| EP | 2860410 A1 | 4/2015 |
| GB | 1492206 A | 11/1977 |

OTHER PUBLICATIONS

EP Search Report dated Feb. 7, 2020 in re EP Application No. 19195734.9.

PRC-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.

Porex Corporation, "Porex(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com//files/documents/POREX-Battery-Vents---Letter-for-Web.pdf.

* cited by examiner

COMBUSTION QUENCHING FASTENER CAPS WITH HOLES

This application claims priority from U.S. Provisional App. No. 62/729,677, filed 11 Sep. 2018, the disclosure of which is incorporated by reference herein in its entirety.

TECHNOLOGICAL FIELD

The present disclosure relates generally to devices and methods for quenching ignition and, more specifically, to a cover configured to be positioned over a fastener to quench ignition.

BACKGROUND

In the aerospace industry, lightning strikes of aircraft are a concern because they could result in electrical arcs, vaporized materials creating hot gas, and/or heating sufficient to ignite vaporous fuel mixtures. Though lightning normally passes through an aircraft without resulting harm, newer aircraft designs incorporate composite materials with less metal and conductors to shunt and/or dissipate the energy of a lightning strike.

During a lightning strike on an aircraft, a high electrical current may propagate through conductive paths on the aircraft. Due to the non-isotropic electrical conduction of composite materials used in certain aircraft designs and potentially poor electrical connection at panel interfaces, the electrical current can pass through a fastener when propagating from one composite panel to another. While passing through a fastener, the current may generate electromagnetic effects, such as electrical arcs, hot gas, and/or hot particles, that may interact with combustible fuel vapor (in the absence of safety measures). Such an uncontained emission of energy may pose an ignition risk to aircraft fuel tanks. In a typical commercial aircraft, hundreds to thousands of fasteners can extend into the fuel tank, and each should be configured to prevent ignition in the event of a lightning strike.

As a safety measure, the fasteners can be covered with polysulfide cap seals to seal fuel mixtures in a fuel tank from any arcs, hot gas, or hot particles that may form as a result of a lightning strike. However, these caps require an airtight seal that remains intact during the lightning strike to be effective. Without an airtight seal, fuel may contact the fastener and/or the arc, hot gas, or hot particles can bypass the unsealed cap to present an ignition risk. Additionally, environmental exposure (e.g., thermal cycling) and/or electromagnetic effects at the fastener can damage the seal. Achieving a resilient, airtight seal is a labor-intensive process that may need to be repeated thousands of times per aircraft. The associated installation time as well as inspection time increase the cost and production time of aircraft.

SUMMARY

One aspect is directed to a cover that includes a base with a first end and an opposing second end. A cap with an open end is positioned at the second end of the base. The cap also includes a closed end. A interior space positioned within the base and cap is sized to extend over at least one fastener. Holes extend through the cap from the interior space to an exterior environment external to the cap. Each of the holes includes a hydraulic diameter of between 0.1 mm-2.0 mm.

One aspect is directed to a cover that includes a body with an open first end and a closed second end, an inner side and an outer side, and an interior space sized to extend over a fastener. Holes extend through the body to allow passage of a fluid from the interior space to an exterior environment. Each of the holes includes a first end at the inner side and a second end at the outer side. An exclusion zone is positioned in the interior space at a center of the first end of the body. Each of the holes is configured such that a straight line that extends between any point at the first end and any point at the second end does not intersect with the exclusion zone.

One aspect is directed to a method of installing a cover over a fastener. The method includes positioning a cover over a fastener that extends from a member with an open first end of the cover positioned around the fastener and a closed second end of the cover extending over the fastener. The cover includes holes that extend through the cover with a first end on an inner side of the cover and a second end at an outer side of the cover. The method includes aligning the cover over the fastener with the holes aligned to prevent the fastener from being visible through the plurality of holes from an exterior environment.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
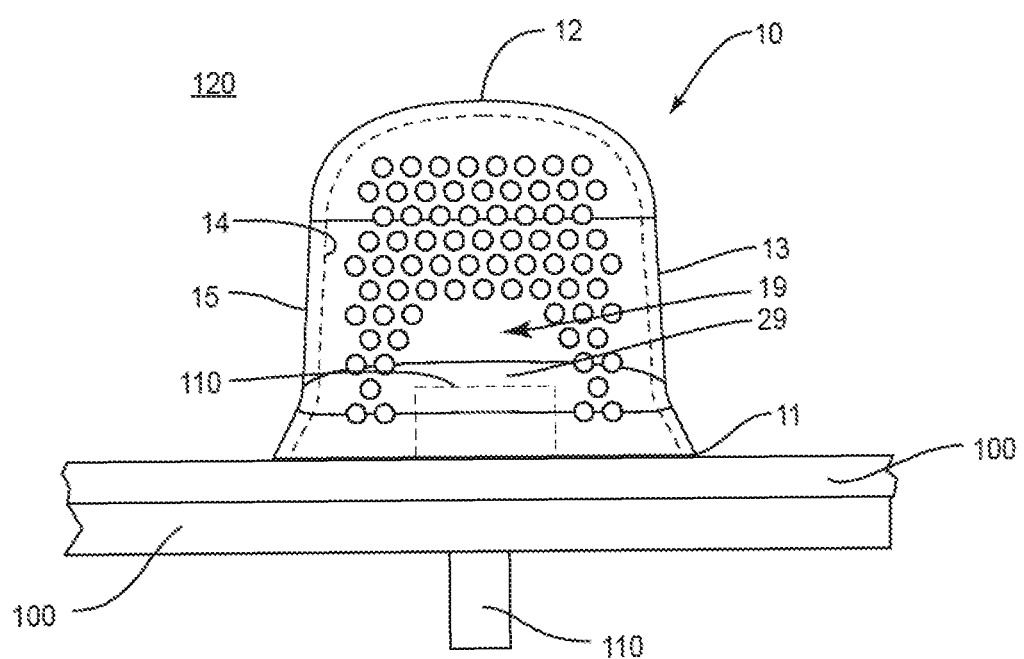

Having thus described variations of the disclosure in general terms, reference will now be made to the accompanying drawings, which are not necessarily drawn to scale, and wherein:

FIG. 1 is a side schematic view of a cover that extends over a fastener in accordance with an embodiment.

Figure 2:
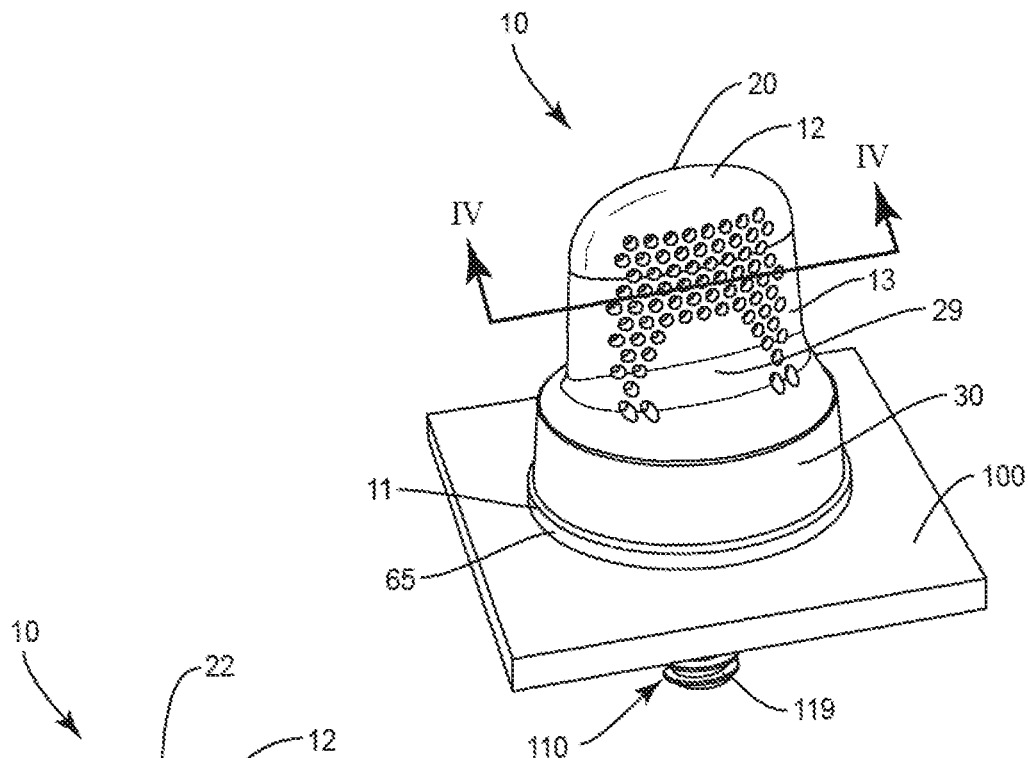

FIG. 2 is a perspective view of a cover that extends over a fastener in accordance with an embodiment.

Figure 3:
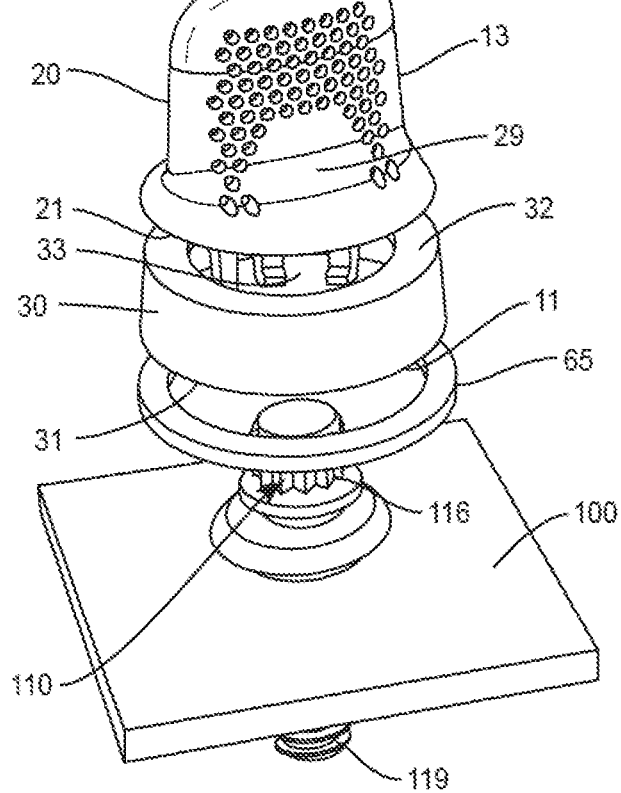

FIG. 3 is an exploded perspective view of the cover of FIG. 2.

Figure 4:
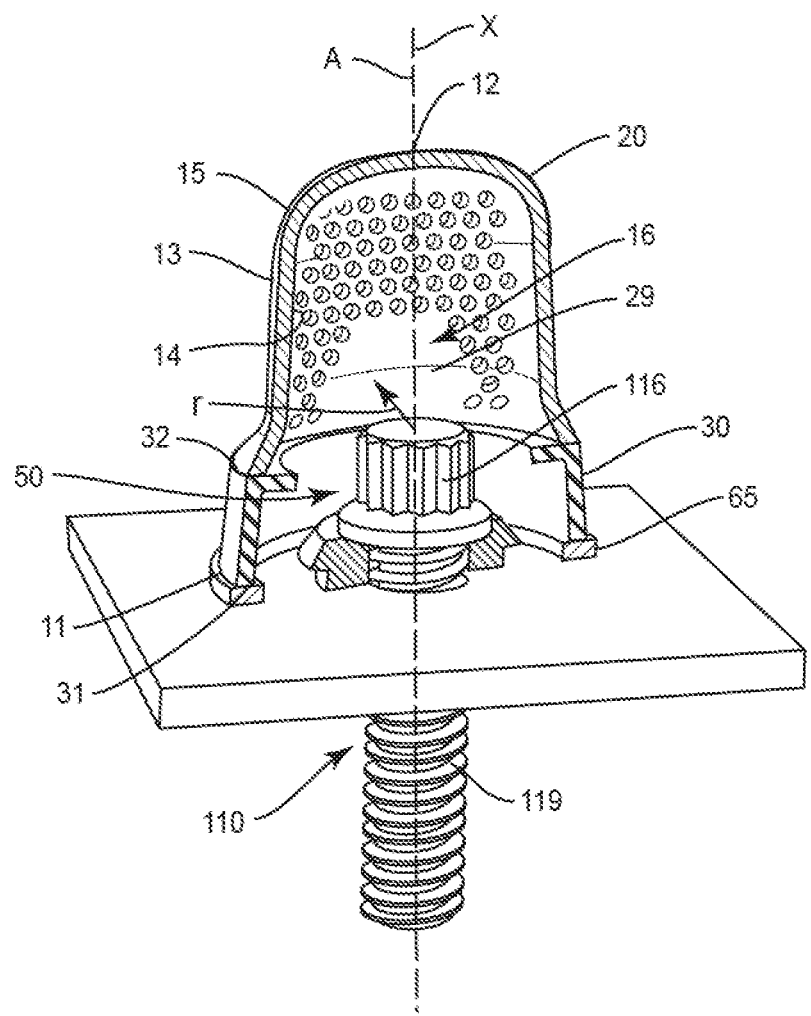

FIG. 4 is a schematic section view of the cover cut along line IV-IV of FIG. 2.

Figure 5:
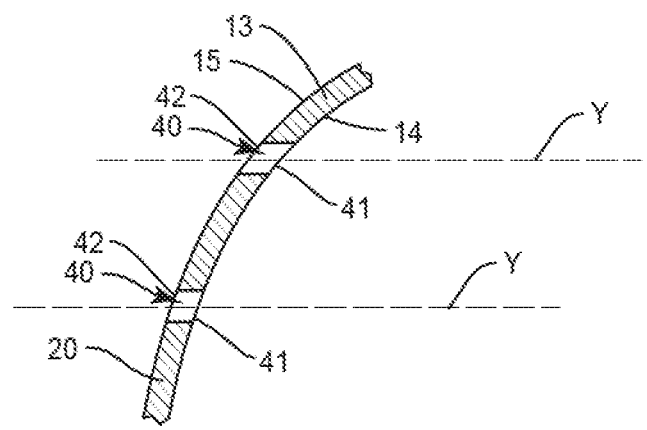

FIG. 5 is a partial schematic section view of a cover with holes in accordance with an embodiment.

Figure 6:
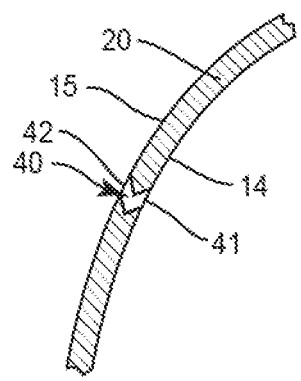

FIG. 6 is a partial schematic section view of a cover with holes in accordance with an embodiment.

Figure 7:
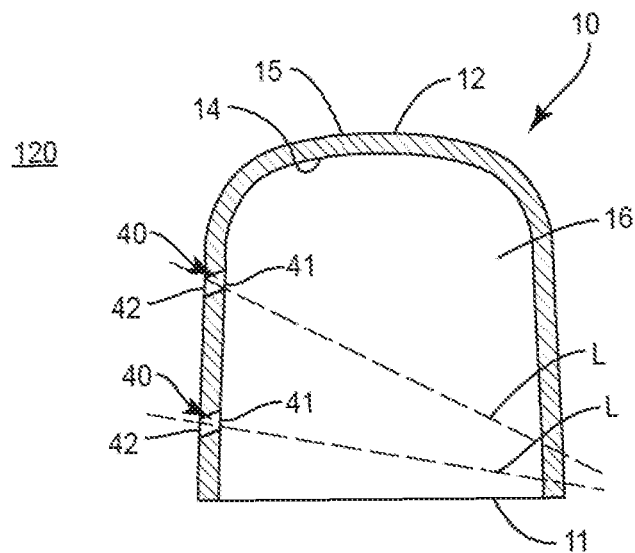

FIG. 7 is a schematic section view of holes aligned for a line of sight to be away from a first end of a cover in accordance with an embodiment.

Figure 8:
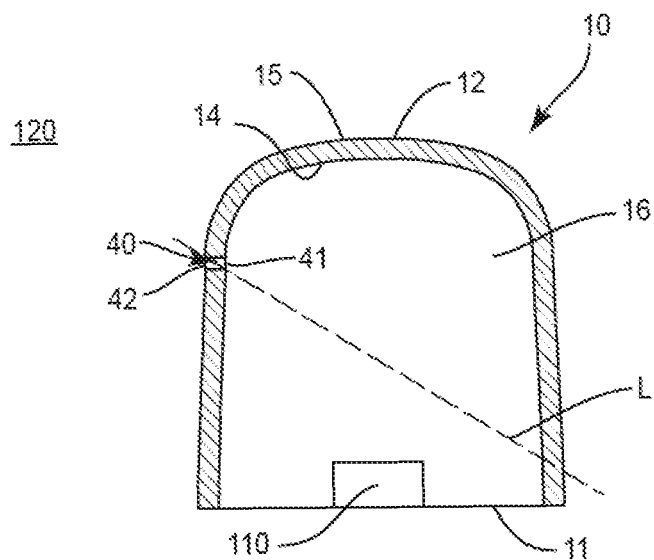

FIG. 8 is a schematic section view of holes aligned for a line of sight to be away from a first end of a fastener in accordance with an embodiment.

Figure 9:
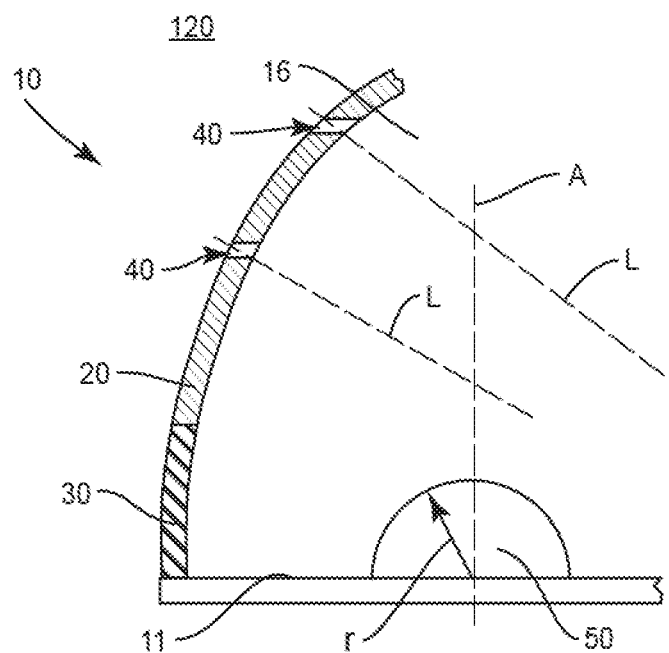

FIG. 9 is a schematic section view of holes aligned for a line of sight to be away from an exclusion zone in accordance with an embodiment.

Figure 10:
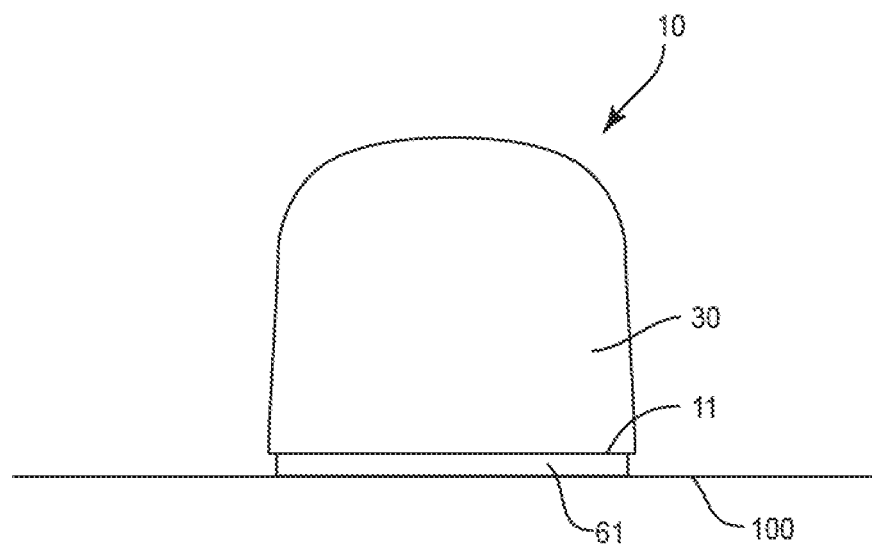

FIG. 10 is a schematic side view of a cover attached to a member in accordance with an embodiment.

Figure 11:
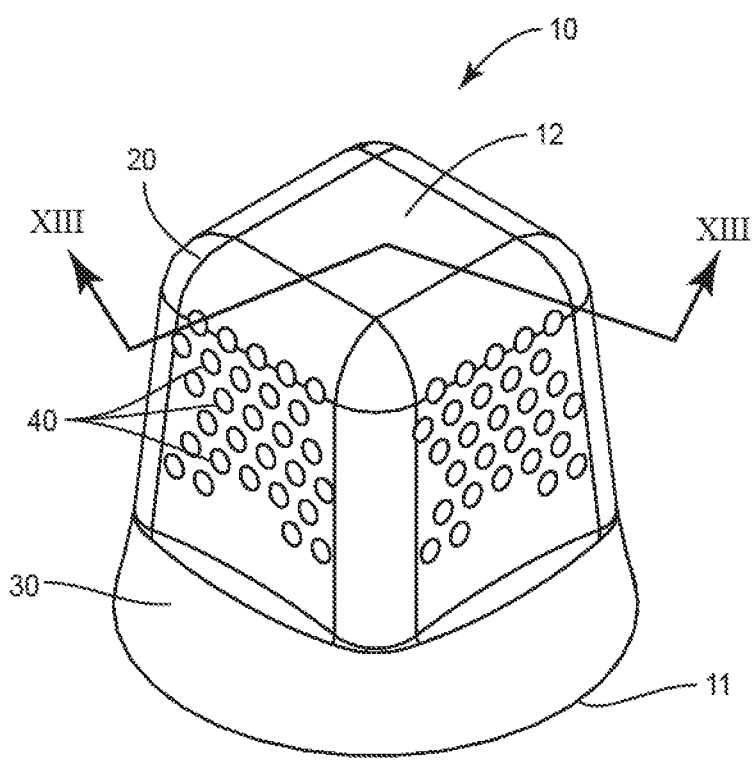

FIG. 11 is a perspective view of a cover in accordance with an embodiment.

Figure 12:
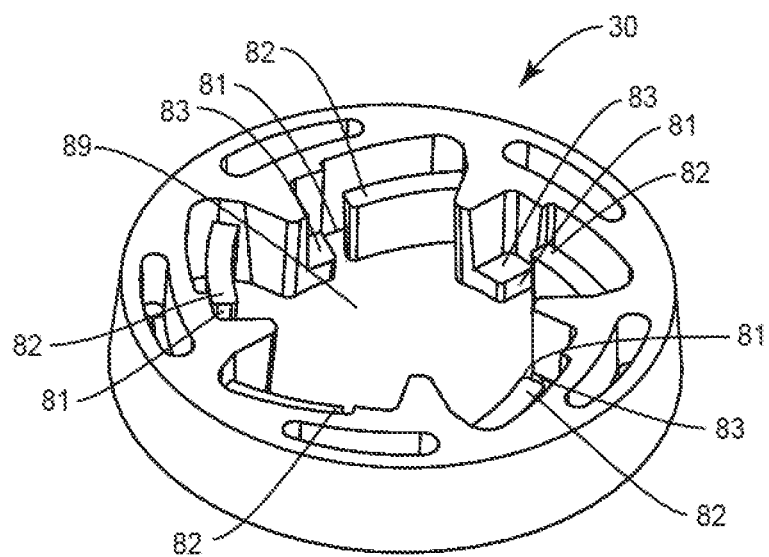

FIG. 12 is a perspective view of a base in accordance with an embodiment.

Figure 13:
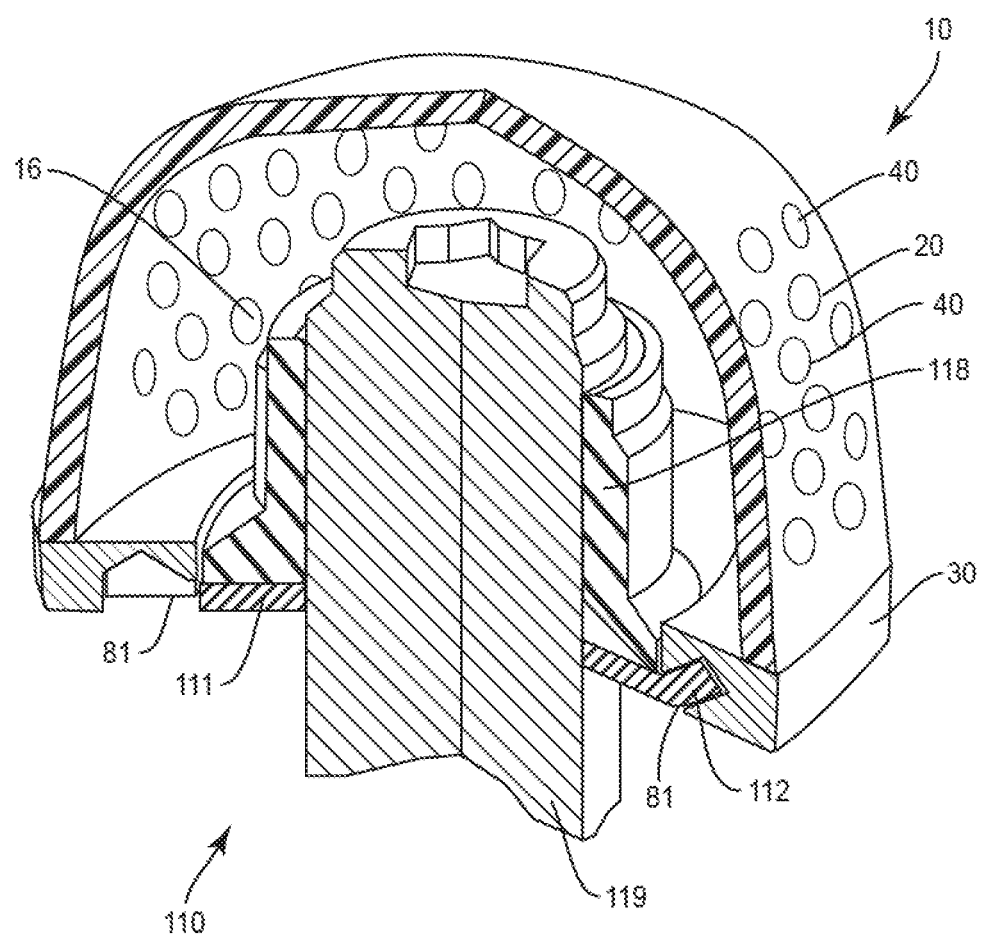

FIG. 13 is a schematic section view of a cover cut along line XIII-XIII of FIG. 11 that extends over a fastener in accordance with an embodiment.

Figure 14:
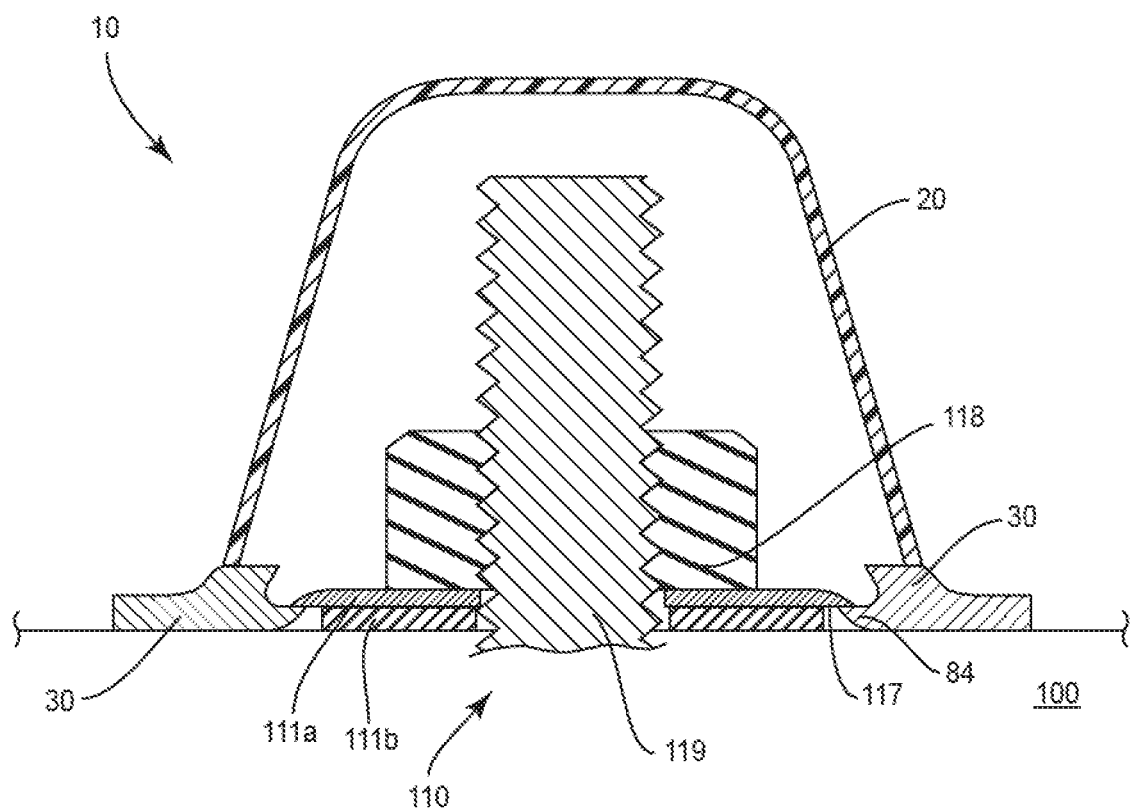

FIG. 14 is a schematic section view of a cover that extends over a fastener in accordance with an embodiment.

Figure 15:
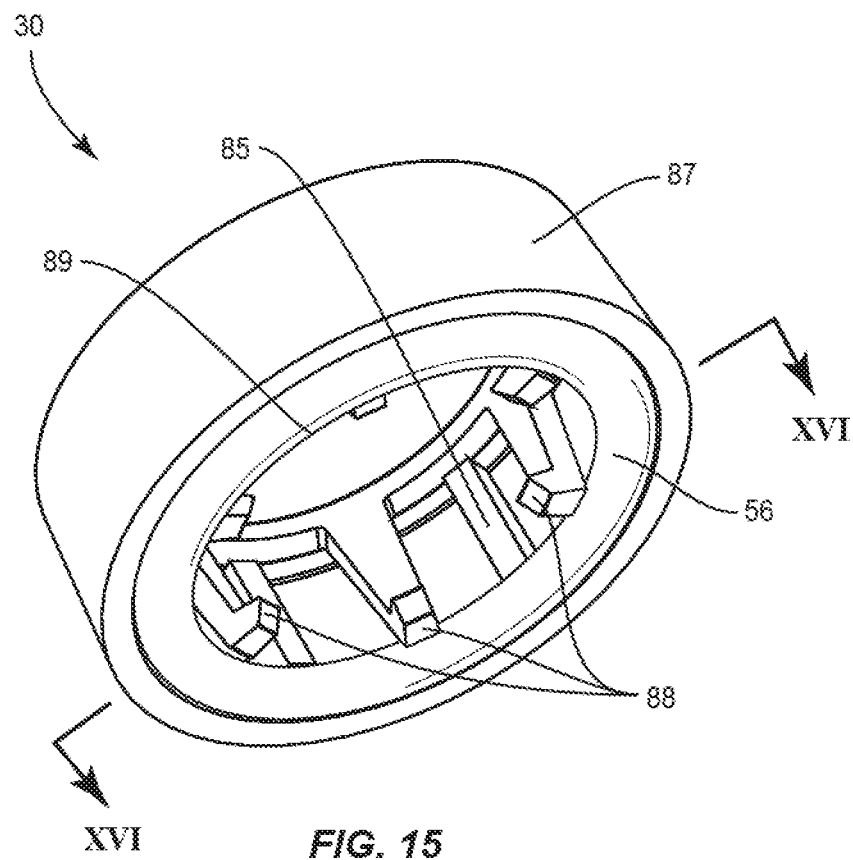

FIG. 15 is a perspective view of a base in accordance with an embodiment.

Figure 16:
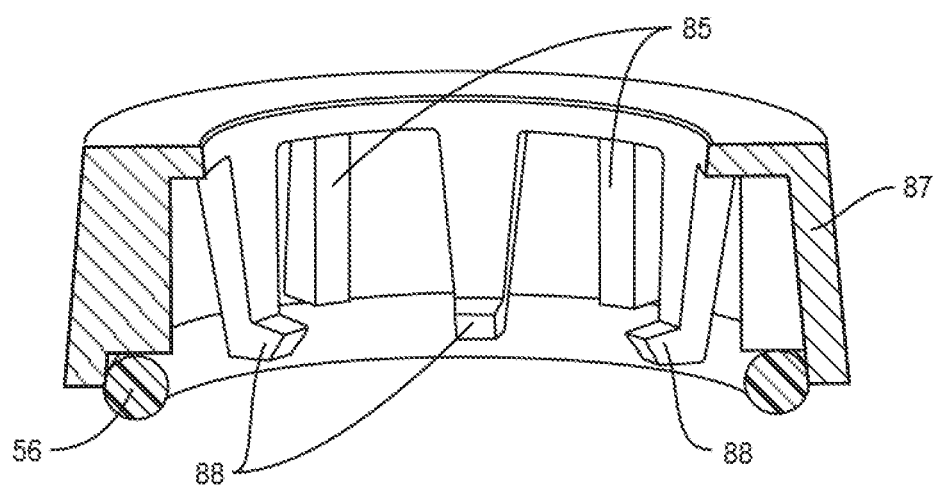

FIG. 16 is a schematic section view of the base of FIG. 15 cut along line XVI-XVI.

Figure 17:
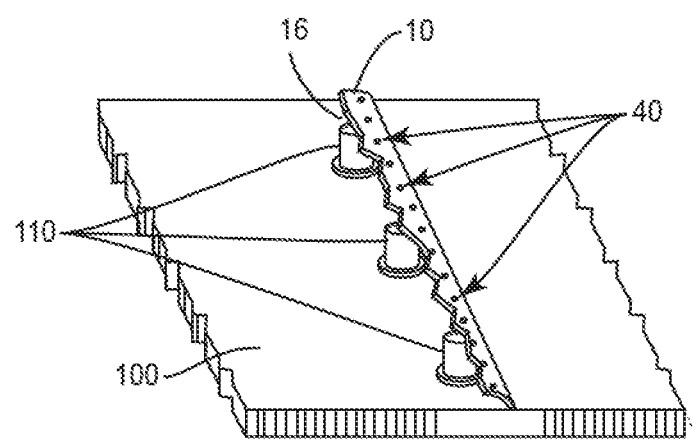

FIG. 17 is a schematic section view of a cover that extends over multiple fasteners in accordance with an embodiment.

DETAILED DESCRIPTION

FIG. 1 schematically illustrates a cover 10 that extends over a fastener 110. The cover 10 includes a body 13 that forms a cavity 19 with an open first end 11 that extends around the fastener 110. The cover 10 also includes a closed second end 12 that extends over the fastener 110 and shields the fastener 110 from a combustible exterior environment 120. The cover 10 includes an inner side 14 that faces towards the fastener 110, and an opposing outer side 15. Holes 40 extend through the cover 10 between the inner and outer sides 14, 15. The holes 40 vent gas, liquid, and/or some particles through the cover 10 while removing the thermal and/or kinetic energy that may ignite the combustible exterior environment 120. The holes 40 are aligned to prevent a line of sight from the exterior environment 120 to the fastener 110.

FIGS. 2-4 illustrate a cover 10 that extends over a fastener 110. The fastener 110 is connected to one or more members 100. The fastener 110 is positioned in a combustible exterior environment 120 and is shielded by the cover 10. The fastener 110 includes a body 119 and a head 116. The fastener 110 may be any suitable fastener such as a threaded fastener (e.g., a bolt or screw), a stud, a pin, a rivet, etc. and the like. The fastener 110 includes metal and/or conductive components that could shunt electrical current and/or be associated with electromagnetic effects that may become ignition sources.

The fastener 110 can be positioned with the head 116 within the cover 10. The fastener 110 can also be positioned with the body 119 positioned within the cover 10.

The member 100 generally includes a structure (such as a plate) that is non-metallic and that can be less electrically conductive than the fastener 110. The member 100 can include and/or can be an electrical insulator (electrically non-conductive) and/or a poor electrical conductor. The member 100 can also include an electrical conductor such as electrically-conductive filler and/or reinforcement material (e.g., metallic filler and/or carbon fiber), and/or may include an electrically-conductive layer (e.g., metallic film, metal plate, etc.). The member 100 can include, and/or can be constructed of, a polymer (e.g., polyurethane), a composite material (e.g., a carbon fiber-reinforced polymer (CFRP) and/or fiberglass), a ceramic, and/or a metal. The member 100 can be a plate, a sheet, a web of material, and/or a larger part of an object (e.g., wing, fuselage).

The fastener 110 would be exposed to the combustible exterior environment 120 and potentially would present a risk of an ignition event. However, the cover 10 when installed over the fastener 110 positions the fastener 110 within an interior space 16 and isolates the volume of the combustible environment around the fastener 110 from the combustible exterior environment 120. Ignition of the combustible environment that occurs within the interior space 16 does not propagate outside of the cover 10 and does not ignite the combustible exterior environment 120.

The exterior environment 120 can include a combustible substance and/or mixture. For example, combustible exterior environment 120 can include a fuel (e.g., hydrogen, gaseous, liquid, and/or aerosolized hydrocarbon, and/or suspended particulate such as sawdust, etc.), an oxidizer (e.g., oxygen, fluorine, and/or nitrous oxide), and optionally a non-reactive diluent (e.g., nitrogen, argon, and/or helium) with concentrations within the flammability limits of the fuel/oxidizer mixture. As another example, combustible exterior environment 120 can include a gas that undergoes explosive decomposition (e.g., acetylene, nitrous oxide). Additional specific examples of fuels include motor fuels such as automotive fuel, diesel fuel, aviation fuel, and/or jet fuel. Combustible exterior environments 120 can include gases, vapors, aerosols, and/or particulate.

The cover 10 can prevent the ignition of the combustible exterior environment 120 by preventing a hot particle that is emitted from the fastener 110 from travelling through the cover 10. As used herein, the term "hot particle" refers to a particle that is emitted from the fastener 110 due to an ignition source at the fastener 110 that has a size and/or a thermal energy sufficient to cause ignition of the combustible exterior environment 120. The cover 10 is configured such that there are no straight-line trajectories through the cover 10 from the fastener 110 to the exterior environment 120 and no line of sight from the exterior environment 120 to the fastener 110.

As illustrated in FIG. 4, the cover 10 forms an interior space 16 that extends over the fastener 110. The cover 10 includes a body 13 with a first end 11 that is open to extend around the fastener 110, and a second end 12 that is closed and extends over the fastener 110. The cover 10 includes an inner side 14 that faces inward towards the interior space 16 and an outer side 15 that faces away. Holes 40 extend through the cover 10 between the inner and outer sides 14, 15.

The cover 10 can include a unitary, single-piece construction, or a multiple-piece construction. As illustrated in FIG. 3, a multiple-piece cover 10 may include a cap 20 and a base 30.

The base 30 includes a first end 31 and opposing second end 32. The base 30 includes a central opening 33 that forms a portion of the interior space 16. The base 30 is configured to support the cap 20 and can be coupled to the cap 20 in various manners, including but not limited to bonding, fusing, welding, heat staking, and adhesive bonding. For example, the base 30 can be coupled to the cap 20 by adhesive such as epoxy, cyanoacrylate, polyurethane, polysulfide, etc. As another example, the base 30 can be coupled to the cap 20 by sintering, welding, etc. (e.g., hot gas welding, polymer welding rod, hot plate welding, contact welding, high frequency welding, induction welding, friction welding, spin welding, laser welding, ultrasonic welding, and/or solvent welding). As yet another example, one or both of the base 30 and cap 20 can have snap-fit features that engage together.

The cap 20 includes a first end 21 and a second end 22. The first end 21 is open and configured to contact against the second end 32 of the base 30. The second end 22 is closed and extends over the interior space 16. The shape and size of the cap 20 can vary. One design includes the first end 21 being flared outward with a width at the first end 21 being greater than a width at the second end 22, with the width being measured perpendicular to a longitudinal axis A of the interior space 16.

The cap 20 can have various thicknesses measured between the inner side 14 and the outer side 15. The thickness can be consistent throughout the cap 20, or can vary. One design includes a thickness in a range of between 0.1 mm-10 mm. A more specific design includes a thickness in the range of between 0.5 mm-5 mm. An even more specific design includes a thickness in the range between 1 mm-3 mm. The thickness of the cap 20 can be the same or different from the thickness of the base 30.

Holes 40 extend through the cap 20 to provide a vent for the interior space 16. As illustrated in FIG. 5, each of the holes 40 includes a first end 41 at the inner side 14 and a second end 42 at the outer side 15. The holes 40 can include various sectional shapes, including but not limited to circular, square, rectangular, elliptical, and filleted rectangles. The holes 40 can be straight such that a centerline Y of each of the holes 40 is parallel to one another. As illustrated in FIG. 6, the holes 40 can also include a bend or corner 44 between the first end 41 and the second end 42. In one design, the bend 44 is formed when the body 13 is injection molded and the molding tools meet along the interior of the body 13.

Each hole 40 includes a hydraulic diameter, $D_H$. The hydraulic diameter $D_H$ is equal to four times the flow area divided by the wetted perimeter of the hole 40. The hydraulic diameter $D_H$ can be determined at a smallest sectional area of the hole 40. This is defined below in equation [1]:

$$D_H = 4A/P \qquad [\text{Eq. 1}]$$

A=the cross-sectional area of the hole
P=the perimeter of the cross-section of the hole
The hydraulic diameter $D_H$ can vary. One design includes each of the holes 40 with a hydraulic diameter $D_H$ between 0.1-2.0 mm. Another design includes each of the holes 40 with a hydraulic diameter $D_H$ between 0.1-1.5 mm. Another design includes each of the holes 40 with a hydraulic diameter $D_H$ between 0.5-1.2 mm.

The holes 40 vent gas, liquid, and/or particles to flow through the cover 10 while removing the thermal and/or kinetic energy that may ignite the combustible exterior environment 120. The holes 40 can also allow drainage of fluid from the interior space 16, such as fuel when the cover 10 is submersed within a fuel tank.

The number of holes 40 in the cover 10 can vary. In one design, the cover 10 includes at least four (4) holes. In one design, the holes 40 extend over between 0.1%-90% of the surface area of the cover 10. One design includes the holes 40 isolated in just the cap 20. Another design includes the holes 40 positioned in the cap 20 and the base 30.

FIG. 7 includes a cover 10 with holes 40 configured to prevent a line of sight to the first end 11. This can include a straight line L drawn through any point at the first end 41 of the hole 40 and any point at the second end 42 of the hole 40 does not intersect with the first end 11 of the cover 10. FIG. 8 includes a cover 10 with a straight line L drawn through any point at the first end 41 of the hole 40 and any point at the second end 42 of the hole 40 does not intersect with the fastener 110.

As illustrated in FIGS. 2-4, the cap 20 includes a masking area 29 at the first end 31. The masking area 29 does not include holes 40. The masking area 29 prevents a line of sight through the holes 40 to the fastener 110.

The holes 40 can be configured to prevent a line of sight from the exterior environment 120 to an exclusion zone 50 within the interior space 16. As illustrated in FIG. 9, the exclusion zone 50 is centered at the intersection of the first end 11 of the cover 10 and the longitudinal axis A of the interior space 16. The exclusion zone 50 can include a radius r that extends from the intersection. The radius r is sized for the exclusion zone 50 to be large enough to contain the fastener 110. The holes 40 are configured for straight lines L drawn through any point at the first end 41 of the hole 40 and any point at the second end 42 of the hole 40 to not intersect with the exclusion zone 50.

The cover 10 can be constructed from various materials. The materials can include but are not limited to polymers, reinforced polymers, polymer composites, and non-conductive ceramics. Examples of polymers include but are not limited to those that can withstand exposure to jet fuel such as PEEK, nylon, PTFE, polyimide, acetal, PFA, Lytex, Melamine Phenolic, Polybutylene terephthalate, and Torlon. In one design, the material is conducive to form the cover 10 through injection molding. In covers 10 that include both a cap 20 and a base 30, the cap 20 and base 30 can be constructed from the same or different materials. In one design, the base 30 can be constructed from metallic components, such as but not limited to aluminum, titanium, steel.

The cover 10 is positioned on the member 100. The first end 11 can contact directly against the member 100. In some designs, there is a spacing between the cover 10 and the member 100. As illustrated in FIGS. 2-4, the spacing can be at least partially filled with a spacer 65 (e.g., an O-ring, a gasket). As illustrated in FIG. 10, the spacing can also be filled with an adhesive 61 (e.g., epoxy, cyanoacrylate, polyurethane, polysulfide, etc.). The adhesive 61 can form an airtight seal. Unfilled regions of the spacing are sized and/or arranged to prevent a nascent flame front and/or a hot particle from propagating around the cover 10 (through the spacing) and potentially igniting the exterior environment 120. For example, the unfilled regions of the spacing can have dimensions smaller than the hydraulic diameter HD. The maximum distance between the cover 10 and the member 100 that is not filled (i.e., unfilled regions of the spacing) can be less than 1 mm, less than 0.8 mm, or less than 0.5 mm.

The cover 10 can be attached to the fastener 110. The attachment can include one or more elements that extend from the cover 10 and connect with the fastener 110, one or more elements that extend from the fastener 110 and connect with the cover 10, and combinations thereof. Additionally or alternatively, the attachment can include an adhesive. Further, the adhesive can connect the cover 10 to the member 100. Various adhesives can be used for the attachment, such as but not limited to polysulfide. In one design, the cover 10 includes a base 30 and a cap 20 with the base 30 being connected to the fastener 110.

FIGS. 11-13 include a cover 10 that is connected to the fastener 110. As illustrated in FIG. 11, the cover 10 includes a cap 20 and a base 30. FIG. 12 shows the base 30 with a generally annular shape with a central opening 89 that forms a portion of the interior space 16. Retention features extend around the central opening 89 to engage with the fastener 110. The retention features each include an entry slot 81, a cantilever 82, and a retention slot 83.

FIG. 13 illustrates the fastener 110 engaged with the base 30. The fastener 110 includes a body 119 with threads that engage with a nut 118. A washer 111 extends around the body 119 and includes tabs 112. The tabs 112 and the entry slots 81 are configured to fit together such that the cover 10 can be applied over the fastener 110 after the fastener 110 is installed in the member 100. The entry slots 81 extend to the retaining cantilevers 82 and then to the retention slots 83. The retaining cantilevers 82 are configured to guide the tabs 112 from the entry slots 81 to the retention slots 83. The tabs 112 and/or the retaining cantilevers 82 can be flexible and/or coupled to the respective structure with a flexible arm. The cover 10 can be installed with the tabs 112 in the entry slots 81. A twist of the cover 10 causes the tabs 112 to be driven up the retaining cantilevers 82 until the tabs 112 clear the retaining cantilevers 82. Once the tabs 112 clear the retaining cantilevers 82, the tabs 112 can snap into the retention slots 83 and/or the retaining cantilevers 82 can snap into place to hold the tabs 112 in the retention slots 83. The tabs 112 and/or the retaining cantilevers 82 can make an audible click as the tabs 112 are retained in the retention slots 83 (e.g., to indicate proper installation).

FIG. 12 shows four tabs 112 and four corresponding attachment features on the base 30. Other designs can include different numbers of tabs 112 and attachment features. Also, this design includes the tabs 112 being a portion of the washer 111. However, the tabs 112 can be coupled to or an integral portion of any of the components of the fastener 110 such as the washer 111, the nut 118, and the body 119.

FIG. 14 illustrates a cover 10 coupled to the fastener 110 by a push-style snap lock coupling. The base 30 includes one or more rims 84 and the fastener 110 includes one or more shoulders 117. The shoulder 117 is a surface that engages the rim 84 and entraps the rim 84 between the shoulder 117 and the member 100. The rim 84 can be a continuous annular rim (spanning the entire inner circumference of the cover 10) or can be one or more rims 84 arranged around the inner circumference of the cover 10. The rims 84 can be substantially uniformly distributed or asymmetrically distributed about the inner circumference of the cover 10.

The shoulder 117 can be formed by a combination of two washers 111a, 111b. The underside of the upper washer 111a forms the shoulder 117 in the recess formed by the lower washer 111b between the upper washer 111a and the member 100. In the example of FIG. 14, the rim 84 is formed at the edge of the cover 10 as an annular protrusion. The rim 84 is configured to flex as the cover 10 is pushed down to the member 100. When the rim 84 is pushed past the shoulder 117, the rim 84 relaxes into the position shown in FIG. 14 in which the rim 84 is entrapped between the shoulder 117 and the member 100.

FIGS. 15 and 16 illustrate another base 30. Base 30 includes a body 87 with an annular shape with an enclosed central opening 89. Cantilevered legs 88 extend outward from an inner side of the body 87 towards the central opening 89. The ends of the legs 88 can be radially spaced inward from the inner side of the body 87. Pegs 85 can also be positioned along the inner side of the body 87. A gasket 86 can be positioned between the legs 88 and the inner side of the body 87. The gasket 86 is further positioned between ends of the pegs 85 and the bottom edge of the body 87. The gasket 86 can conform the base 30 to the member 100 which can have an uneven shape. In one use, the composite structure of a member 100 in an aircraft is typically not smooth and can contain other irregularities. The gasket 86 can accommodate the irregularities and prevent a flow path into the interior space 16 that has a greater hydraulic diameter $H_D$ than allowed given the mixture and ignition source. The gasket 86 can also prevent a line of sight trajectory for hot particles. The gasket 86 includes an annular shape and extends around the base 30. The gasket 86 can be constructed from various materials, including but not limited to nitrile rubber and fluorosilicone rubber. The gasket 86 can include the same or different thicknesses as different locations.

The cover 10 can be sized to cover and/or to enclose multiple fasteners 110 as illustrated in FIG. 17. The fasteners 110 can be arranged as a row, a circle, an array, a cluster, etc. The cover 10 can include a single interior space 16 that is sized to extend over each of the fasteners 110. The cover 10 can include two or more separate interior spaces 16 that each are sized to extend over one or more fasteners 110. The different interior spaces 16 can be separated by one or more walls. The cover 10 can be configured to connect to each of the two or more fasteners 110 that are located in the interior space.

The cover 10 can be used in a variety of different contexts. One use includes on a fuel tank, such as a wing fuel tank in a composite wing aircraft. The fastener 110 can be exposed to the fuel volume and/or ullage space (e.g., extending into the interior of the fuel tank) and embedded in and/or coupling one or more members 100 which contact the fuel volume and/or ullage space. The members 100 can be carbon-fiber composite panels, partitions, stringers, etc. that are in the interior of the fuel tank and/or define at least a portion of the interior of the fuel tank. The cover 10 covers the fastener 110 and is collocated with the fastener 110. An ignition source associated with the fastener 110 can develop and trigger an ignition event at the fastener 110. For example, due to, e.g., a lightning strike or the friction of fuel movement, electrical charge and/or an electrical voltage may develop at the fastener 110 sufficient to cause an electrical discharge or other potential ignition source. The ignition event includes an ignition kernel, a nascent flame front, and/or a pressure wave within the interior space 16 of the cover 10. The ignition kernel is quenched by the cover 10; the nascent flame front is quenched as it traverses the cover 10; and/or the pressure wave can be dissipated and/or impeded by the cover 10.

The cover 10 can be useful in other applications requiring ignition hazard consideration, including fuel transport, fuel storage, mining operations, chemical processing, metal fabrication, power plant construction and operation, and operations which involve combustible particulate such as suspended dust, sawdust, coal, metal, flour, and/or grain.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A cover, comprising:
a base comprising a first end and an opposing second end;
a cap comprising an open end positioned at the second end of the base, the cap further comprising a closed end;
an interior space positioned within the base and the cap and that is sized to extend over at least one fastener; and
a plurality of holes that extend through the cap from the interior space to an exterior environment external to the cap, each of the holes comprises a hydraulic diameter of between 0.1 mm 2.0 mm.

2. The cover of claim 1, wherein:
the interior space comprises a longitudinal axis that extends through the first end of the base;
an exclusion zone positioned in the interior space at an intersection of the first end and the longitudinal axis; and
the holes are aligned to prevent a line of sight through the holes from the exterior environment to the exclusion zone.

3. The cover of claim 1, wherein the holes comprise between 0.1%-90% of a surface area of the cap and the base.

4. The cover of claim 1, wherein each of the holes comprises a centerline that is straight, and wherein the centerlines of each of the holes are parallel.

5. The cover of claim 1, wherein each of the holes comprises a bend between a first end of the hole and a second end of the hole.

6. The cover of claim 1, wherein the cap comprises a masking area that is devoid of the holes, the masking area extending from the open end towards the closed end.

7. The cover of claim 1, wherein the open end of the cap has a greater width than the closed end with the width being measured perpendicular to a longitudinal axis of the cap.

8. The cover of claim 1, wherein the holes are aligned to prevent a line of sight from the exterior environment to the first end of the base.

9. The cover of claim 1, further comprising a gasket positioned at the first end of the base, the gasket configured to conform the first end of the base against a member.

10. A cover, comprising:
a body comprising an open first end and a closed second end, an inner side and an outer side, and an interior space sized to extend over a fastener; and
a plurality of holes that extend through the body to allow passage of a fluid from the interior space to an exterior environment, each of the holes comprising a first end at the inner side and a second end at the outer side;
a masking area along the body that is devoid of the plurality of holes, the masking area extending from the open end towards the closed end and with the plurality of holes positioned along lateral sides of the masking area and directly above the masking area between a top of the masking area and the second end of the body;
an exclusion zone positioned in the interior space at a center of the first end of the body, each of the holes is configured such that a straight line that extends between any point at the first end and any point at the second end does not intersect with the exclusion zone.

11. The cover of claim 10, wherein each of the holes comprises a hydraulic diameter of between 0.1 mm 2.0 mm.

12. The cover of claim 10, wherein the body comprises a base with a first end and a second end, and a cap attached to the base and positioned at the second end of the base.

13. The cover of claim 12, wherein the interior space is sized to extend over two or more of the fasteners.

14. The cover of claim 10, wherein the cover is mounted in a fuel cell of an aircraft and configured to quench an ignition event in the fuel cell triggered by an ignition source associated with a fastener.

15. The cover of claim 10, wherein each of the holes is straight and wherein each of the holes includes a centerline, with the centerlines of each of the holes being parallel.

16. The cover of claim 10, wherein the holes are aligned to prevent a line of sight through the holes from the exterior environment to the first end of the body.

17. A method of installing the cover of claim 1 over one of the at least one fasteners, the method comprising:
positioning the cover over the fastener that extends from a member with the open end of the cover positioned around the fastener and a closed end of the cover extending over the fastener, the cover comprising a plurality of holes that extend through the cover with a first end on an inner side of the cover and a second end at an outer side of the cover; and
aligning the cover over the fastener with the holes aligned to prevent the fastener from being visible through the plurality of holes from the exterior environment.

18. The method of claim 17, wherein aligning the cover over the fastener comprises aligning the cover such that for each hole a straight line that extends through any point at the second end of the hole and any point at the first end of the hole does not intersect with the fastener.

19. The method of claim 17, further comprising aligning a solid section of the cover adjacent to the fastener and aligning the holes farther away from the fastener.

20. The method of claim 17, further comprising positioning the cover over the fastener and at least a second one of the at least one fastener.

* * * * *

UNITED STATES PATENT AND TRADEMARK OFFICE
CERTIFICATE OF CORRECTION

PATENT NO. : 11,078,947 B2
APPLICATION NO. : 16/209312
DATED : August 3, 2021
INVENTOR(S) : Christopher Stephen Roper et al.

It is certified that error appears in the above-identified patent and that said Letters Patent is hereby corrected as shown below:

In the Claims

Column 9, Line 33, in Claim 11, delete "between 0.1 mm 2.0 mm", and insert --between 0.1 mm - 2.0 mm--, therefor.

Signed and Sealed this
Twenty-fourth Day of May, 2022

Katherine Kelly Vidal
*Director of the United States Patent and Trademark Office*